Sept. 20, 1949.  K. N. FROMM  2,482,473
ARC WELDING APPARATUS
Filed Nov. 3, 1948

WITNESSES:
Robert C. Baird
F. J. Giolma

INVENTOR
Kenneth N. Fromm.
BY G. M. Crawford
ATTORNEY

Patented Sept. 20, 1949

2,482,473

UNITED STATES PATENT OFFICE 2,482,473

ARC WELDING APPARATUS

Kenneth N. Fromm, Pittsburgh, Pa., assignor to Westinghouse Electric Corporation, East Pittsburgh, Pa., a corporation of Pennsylvania Application November 3, 1948, Serial No. 58,137

9 Claims. (Cl. 315—246)

My invention relates, generally, to arc welding apparatus, and it has reference in particular to arc initiating and stabilizing systems for use with arc welding systems or circuits.

Generally stated, it is an object of my invention to provide an arc initiating and stabilizing system for use with arc welding circuits that is simple and inexpensive to manufacture and reliable and effective in operation.

More specifically, it is an object of my invention to provide an arc initiating and stabilizing system for producing periodic voltage impulses for application to an arc welding circuit.

Another object of my invention is to provide, in an arc welding system, for applying a relatively high voltage impulse to the arc circuit for initiating an arc, and an impulse of less value or magnitude during welding for stabilizing the arc.

Yet another object of my invention is to provide, in an arc initiating and stabilizing system, for synchronizing a blocking oscillator in accordance with the voltage in an alternating current arc welding circuit for applying damped impulses to the welding circuit.

It is an important object of my invention to provide, in an arc welding system, for using a pulsed oscillator for initiating and stabilizing the arc.

Another important object of my invention is to provide, in an alternating current arc initiating and stabilizing system, for utilizing an oscillator having a grid circuit time constant greater than 1/60 of a second so that the initial impulse may be of greater magnitude than subsequent impulses.

Other objects will in part be obvious, and will in part be explained hereinafter.

In practicing my invention in one of its forms, a blocking oscillator, which is normally biased to prevent oscillation, is keyed by a 60 cycle voltage derived from an alternating current arc welding circuit. The output of the blocking oscillator is fed through a cathode follower which is coupled to the welding circuit for applying periodic voltage impulses to the circuit for initiating and stabilizing a 60 cycle welding arc therein.

Figure 1:
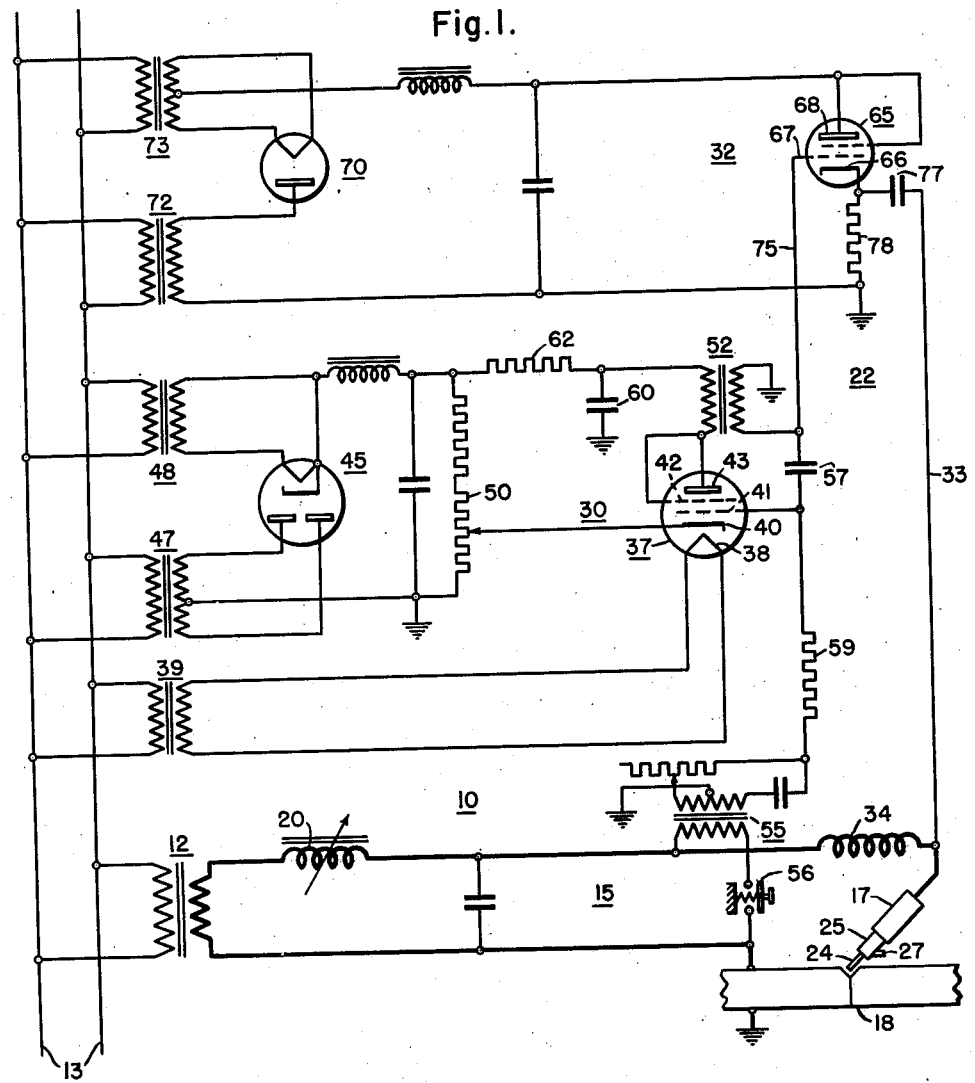
Figure 2:
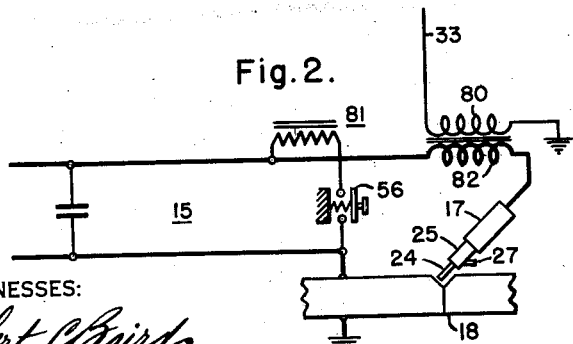

For a more complete understanding of the nature and scope of my invention, reference may be made to the following detailed description which may be read in connection with the accompanying drawing, in which:

Fig. 1 is a diagrammatic view of an arc welding system embodying the invention in one of its forms, and Fig. 2 is a partial diagrammatic view of an arc welding system showing an alternate form of connection of the arc initiating and stabilizing system to the welding circuit.

Referring to Fig. 1, the reference numeral 10 may denote generally an arc welding system wherein a welding transformer 12 may be connected to a source of alternating current represented by the conductors 13 for supplying welding current to an arc welding circuit 15, including an electrode holder or welding torch 17 and work 18 upon which a welding operation is to be performed. A variable reactance device 20 may be connected between the welding transformer 12 and the welding circuit 15 for controlling the value of the welding current.

An arc initiating and stabilizing system designated generally by the numeral 22 may be utilized for applying periodic voltage impulses to the welding torch 17 for initiating and stabilizing an arc between the torch 17 and the work 18. The torch or holder 17 may be of any suitable type, and for the purposes of illustration, is shown as comprising, for example, a tungsten welding electrode 24 having a hollow nozzle 25 positioned thereabouts, and provided with suitable means such as the conduit connection 27 for supplying an atmosphere of argon or helium gas to the welding zone.

The arc initiating and stabilizing system 22 may comprise, generally, an oscillator of the relaxation type in which the frequency is controlled by the charge or discharge of a capacitor or inductance through a resistance, such as, for example, a blocking oscillator circuit 30, which may be coupled to the arc welding circuit through a cathode follower circuit 32 and conductor 33, which connects to the welding lead supplying welding current to the welding electrode of the torch or holder 17. A high frequency choke 34 may be interposed between the connection of the conductor 33 to the welding lead and the welding transformer 12, so as to block the voltage impulses of the arc initiating and stabilizing system 22 from the welding transformer.

The blocking oscillator 30 may comprise, for example, a four element valve device 37 having a filament 38 connected to a filament transformer 39, a cathode 40, a control grid 41, a screen grid 42 and an anode 43. The screen grid 42 may be connected to the anode 43, and the anode-cathode circuit of valve 37 may be connected to a suitable source of direct current voltage such as the rectifier device 45, which may be connected to the conductors 13 through a plate transformer 47 and a filament transformer 48. The cathode 40 may be connected above ground potential by means of a potentiometer 50, so as to provide for normally biasing the oscillator from oscillating. A coupling transformer 52 may be utilized to closely couple the anode and grid circuits so as to provide a blocking potential on the control grid 41 and prevent continuous oscillation.

In order to provide for keying and synchronizing operation of the blocking oscillator circuit 30 with the voltage of the arc welding circuit, a control transformer 55 may be utilized to apply a 60 cycle bias voltage to the control grid 41 from the welding circuit for overcoming the blocking bias of the cathode 40 and causing the valve device 37 to oscillate and produce periodic voltage impulses synchronized with the voltage of the arc welding circuit. A capacitor 57 may be connected in the grid circuit of the valve device 37 and a resistor 59 may be connected between the control transformer 55 and a control grid 41, having such a value that the discharge time of the capacitor 57 is on the order of 1/120 of a second.

A capacitor 60 may be connected between the high voltage side of the coupling transformer 52 and ground, and a resistor 62 may be connected between the capacitor 60 and the rectifier device 45 so as to increase the charging time of the capacitor 60 so that the 1/60 of a second between impulses of the blocking oscillator is insufficient to allow the capacitor 60 to charge to its full value.

The output of the blocking oscillator circuit 30 is fed into the cathode follower circuit 32 which may, for example, comprise a four element valve device 65 having a cathode 66, a control grid 67 and an anode 68. The valve device 65 may be supplied with a direct current voltage of relatively high value from a source of supply represented by the rectifier device 70 with its associated plate transformer 72 and filament transformer 73. The output voltage of the rectifier device 70 may be connected between the anode 68 and the cathode 66. The control grid 67 of the valve device 65 may be connected to the blocking oscillator through a conductor 75. The cathode follower circuit 32 may be connected to the arc welding circuit 15 through a capacitor 77 connected on the cathode side of a cathode resistor 78.

In operation, the blocking oscillator 30 will be normally biased against oscillating by reason of the positive bias applied to the cathode 40 from the potentiometer 50. Whenever the operator is ready to weld, a 60 cycle voltage may be applied to the control grid 41 from the arc welding circuit 15 for driving the control grid positive whenever the polarity of the welding electrode 24 is positive. This causes the valve device 37 to produce periodic voltage impulses, by reason of the blocking action produced by the coupling transformer 52. The application of the control voltage from the arc welding circuit 15 may be effected by operating the control switch 56 which may either be located on the handle of the torch or holder 17, or may comprise a portion of the foot switch (not shown) which is usually used to control the application of gas to the welding torch or holder.

Since the blocking oscillator has not been previously operating, the capacitor 60 will be initially charged to the full plate voltage of the valve device 37, so that the first voltage impulse produced thereby will be of a maximum value. Since the charging time for the capacitor 60 is greater than 1/60 of a second, the capacitor 60 will not be fully charged on subsequent impulses, and hence the subsequent impulses will have a lower peak value. The voltage impulses of the blocking oscillator 30 are applied to the cathode follower circuit 32 through conductor 75, thus producing an amplified voltage impulse across the cathode resistor 78. This voltage is applied to the welding electrode 24 through capacitor 77 and conductor 33 to provide a damped impulse for initiating and stabilizing an arc between the welding electrode and the work 18.

Instead of using a shunt connection of the arc initiating and stabilizing system 22 to the arc welding circuit 15, the arc initiating and stabilizing system may be series coupled with the arc welding circuit 15, as shown in Fig. 2. The conductor 33 may, for example, be connected to the primary winding 80 of a coupling transformer 81, the secondary winding 82 of which may be connected in series circuit relation to the welding electrode 24 and the welding transformer 12. In other respects the connections of the arc initiating and stabilizing system, and the arc welding circuit, may be identical with those shown in Fig. 1.

From the above description and the accompanying drawing it will be seen that I have provided in a simple and effective manner for applying periodic voltage impulses to an arc welding circuit for initiating and stabilizing an arc therein. By utilizing an initial impulse of greater magnitude than the subsequent impulses, initiation of the arc is greatly facilitated and the duty cycle on the blocking oscillator and cathode follower of the initiating and stabilizing system may be reduced during a welding operation, when only stabilization of the arc is necessary. Since the oscillator operates only when the voltage of the welding circuit is applied thereto for commencing a welding operation, the duty cycle thereof is reduced to a minimum value. Impulses of as much as 10 kv. peak value may be produced by such a blocking oscillator, from a source of no more than about 350 volts. By properly phasing the blocking oscillator with the arc current and voltage, the maximum effectiveness of the oscillating system may be readily attained as the oscillator is keyed from the arc circuit.

While the invention has been described in connection with an alternating current arc welding system in which the problem of arc initiation and stabilization becomes more or less acute, particularly at open circuit voltages on the order of 65 volts, and when an inert gaseous atmosphere is used with a tungsten electrode, the invention may be used advantageously in initiating direct current arc welding operations with non-consumable or consumable electrodes, with or without the inert gaseous atmosphere.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. The combination with an arc welding system including an arc circuit, of a relaxation oscillator, and a pulse generator triggered by the oscillator connected to apply periodic voltage impulses to the arc circuit.

2. In an alternating current arc welding system, an arc circuit including an electrode for maintaining an arc with work upon which a welding operation is to be performed, a pulse generator disposed to produce a direct current pulse, said pulse generator being coupled to the electrode, an oscillator connected to trigger the pulse generator, and circuit means connected to apply a control voltage to the oscillator from the arc circuit.

3. An arc initiating and stabilizing system for an arc welding system comprising, a pulse generator disposed to produce a direct current pulse, said pulse generator being coupled to the arc welding system, an oscillator connected to trigger the pulse generator, and circuit means connected to apply a control voltage to the oscillator from the arc welding system.

4. The combination with an arc welding system including an electrode for performing a welding operation upon a workpiece, of a grid-controlled pulse generator connected to apply a relatively steep wave voltage impulse between the electrode and the work, and a blocking oscillator connected to apply a periodic voltage pulse to the grid of the pulse generator.

5. In combination, an arc welding system including a welding transformer disposed to supply alternating current to a welding circuit, a pulse generator operable to produce direct current impulses connected to the welding circuit, a blocking oscillator connected to apply a periodic control voltage to the pulse generator, and circuit means connected to apply a synchronizing voltage to the blocking oscillator.

6. The combination with an alternating current arc welding circuit including an electrode for performing a welding operation upon a workpiece, of a grid-controlled pulse generator, circuit means connecting the pulse generator to the electrode for applying an arc initiating and stabilizing impulse thereto, a blocking oscillator connected to apply a periodically recurring control voltage pulse to the grid of the pulse generator, and a control transformer connected in the welding circuit arranged to apply a control voltage to the blocking oscillator.

7. An arc stabilizing system for applying a stabilizing impulse to an arc welding circuit comprising, a grid-controlled pulse generator, circuit means for connecting the pulse generator to the arc welding circuit, a blocking oscillator connected to apply periodic impulses to the pulse generator, said blocking oscillator having a resistor-capacitor discharge circuit with a time constant greater than the period of said impulses.

8. In combination with an arc welding system including an electrode and work connected in an arc circuit, a pulse generator connected to apply a relatively steep wave front impulse to the electrode, an oscillator normally biased to prevent oscillation connected to key the pulse generator, and circuit means connected to apply a control voltage to the oscillator having a predetermined relation to the voltage of the arc circuit for initiating operation of the oscillator.

9. In an arc stabilizing system for an arc welding circuit, a pulse generator connected to apply voltage pulses to the arc welding circuit, a blocking oscillator normally biased against oscillation connected to apply control impulses to the pulse generator, capacitor means connected in circuit relation with the blocking oscillator to provide a high peak value initial impulse, and circuit means connected to the welding circuit to supply a control voltage for overcoming the bias on the oscillator.

KENNETH N. FROMM.

No references cited.